Figure 2:
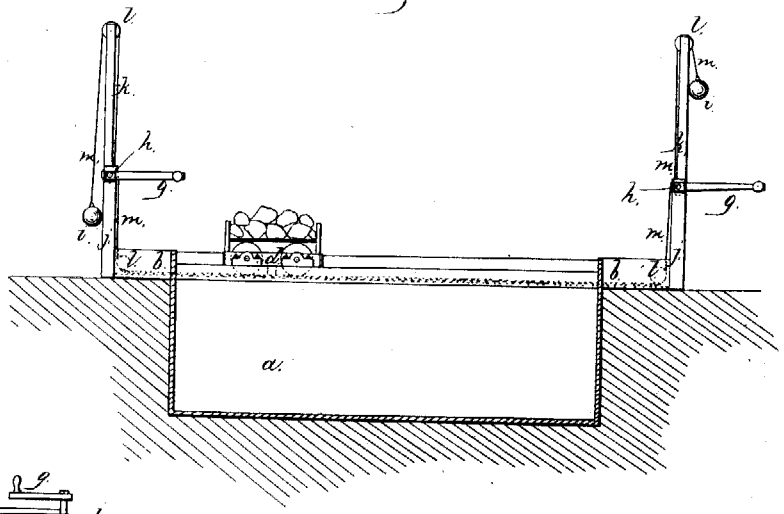
Figure 1:
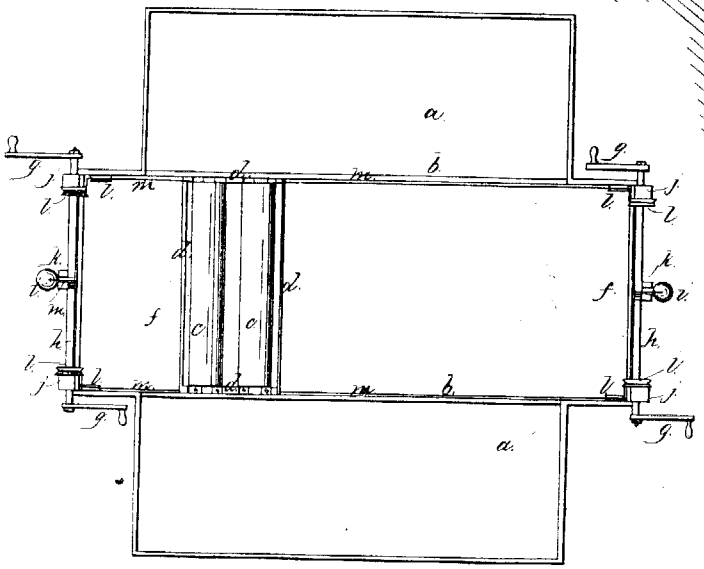

8329X

E. S. & D. Bell,

Preparing Hides.

Patented July 28, 1834.

N. PETERS, PHOTO-LITHOGRAPHER, WASHINGTON, D. C.

July 28. 1834 77

Edward G Bell and Daniel Bell. Smithfield Virginia

8329X

Letters Patent

The Schedule referred to in these Letters Patent and making part of the same containing a description in the words of the said Edward G Bell and Daniel Bell themselves of their improvement in the process of tanning hides and skins To all to whom these presents shall come.

Be it known that We Edward G and Daniel Bell of Smithfield in the County of Jefferson and State of Virginia have invented a new and useful improvement in the process of tanning hides and skins and that the following is a full and exact description of the construction and operation of the said improvement as invented by us The objects contemplated by our improvement are 1st. softening the hides or skins and freeing them from grease &c. 2nd Expanding the hides from the state preparatory to their receiving the tan 3d. Freeing the tannin or tanning principle from the ooze pure by filtering — 4th causing the tanning lixivium more readily to enter the hides or skins by the use of mechanical compression of the hides or skins under the surface of the ooze or out of the ooze whereby shortening the operation.

First, for softening the hides — To every 200 cubic feet of water add 2 1/2 pounds of caustic or unslacked lime (irrigated) 10 pounds of Carbonate of Potash and 1 pound of Carbonate of soda, these are made to dissolve by stirring them well. This mixture affords a pure alkaline liquor in which the hides are suspended or immersed in the usual manner. and they will become completely softened and the grease neutralised in 24 or 36 hours.

Second for expanding the hides commonly termed raising. To every 100 cubic feet of pure gallic lixivium add one pound tartaric acid and one pound Sulphuric acid in which suspend or immerse the hides in the usual manner and a complete expansion

8329X will take place in six or eight hours. Third to procure pure tannin
lixivium by filtering the ooze. When the ooze obtained from the
bark by any of the usual methods found most convenient either
by heat or otherwise has sufficient time to acidify and settle
it is thrown upon a filter in form resembling an ash or common
lie form hopper with about eight inches of raw cotton at the bottom
and sides and then filled in to its top with the fine inner parts
of the exhausted bark or refuse tan. This filter should of course
be placed in the most convenient position for receiving the ooze from
the reservoir by a cock and by delivering in like manner the pure
tannin lixivium which nearly alone passes through it into the
proper vessel from which it is to be drawn for use.
Fourth. the compression of the hides under the surface of the ooze
or out of the ooze or tannin lixivium. This may be effected in various
ways. The method which we have found to be most convenient for
compressing under ooze is described as follows. a substantial smooth
level wooden platform say 16 feet long by 6 feet wide (or the dimen
sions as also all others herein given may be made to suit the size of
the skins &c) is constructed and being supported at the ends
on stony feet or pillars or mason work so as to raise it about 2
feet from the floor or ground. near its middle and on opposite
sides of the platform are placed two vats having a heater in each
of sufficient depth and breadth to admit the skins being suspen
ded therein and sunk in the floor so as to bring their top edge six
or eight inches above the surface of the platform. the edges of the vats
[illegible] to the platform being on a level with it and joined thereto
watertight (or the vats may be continuous under the platform form
ing but one vessel and therefore requiring but one heater) so that by
the addition of an edge board six or eight inches high raised on
the margin of the platform except where it connects with the vats
when they are filled within four or five inches of their highest edges
the liquid will have flown over the platform and will stand to
the depth of two or three inches upon it. Near as is convenient

8329X to the edges of the platform that adjoin the vats two ways or guides
are constructed on the upper surface thereof and running its whole
length nearly. these guides are intended to direct the rollers herein af
ter mentioned and at both ends of each are small leading pulleys
for uses hereafter explained. Two wooden brass or copper rollers
of ten or twelve inches diameter and of a length equal to the dis
tance between the guides are placed crosswise on the platform
their journals (if wooden rollers) should be brass or copper and
are to be fixed in two substantial wooden bridges or end pieces upon
which latter are raised two upright cross frames which serve as
bearings to support a heavy weight (which may be diminished
or altogether dispensed with in case metallic rollers are used) placed
on a floor that joins their upright angles also at the centre of each
of these bridges and on their outsides an arm is ~~framed~~ let in and
firmly secured which descends to within a short distance of the
surface of the platform for the purpose of attaching four strong cords
two to each arm. that run in opposite directions along the outside
of the guides. to the leading pulleys above mentioned. Their use being
to draw the rollers and their incumbent weight back and forth on the
platform. At each end of the platform and immediately behind
the leading pulleys uprights are raised that form the bearings of
two transverse shafts ~~shafts~~ having a pulley on each end inside of
the bearings placed in a line with the leading pulleys above
mentioned to which the cords above mentioned are attached and
around which they are wound up at one end of the platform at
the same time that they unwind at the other by which contrivance
by turning two cranks placed on the extremities of each shaft ei-
ther shaft may be put in motion and the rollers and weight drawn
alternately from one end of the platform to the other with great
facility. for the purpose of taking up the slack of the cords addi-
tional cords are attached to the centre of the shafts each of which
after two or three turns or more around the shafts passes upward
over a small sheave in the upper extremity of a small post raised

8329X from the end of the platform descending on the other side and has
a sufficient weight attached thereto. Operation. the vats on
either side of the platform are filled to within 4 or 6 inches with
the tanning lixivium (obtained as above directed) which by means
of the heaters we raise to 98° degrees of Farenheit — or blood heat
the temperature which we apply to the hides in all the mixtures
herein described,) the hides after being prepared for tanning are
suspended therein, then each taken in its turn and one or more
spread out smoothly on the platform between the guides the rollers
are passed over it or them back and forth (varying its or their
position if necessary) a number of times proportionable to its thick
ness or their thickness by which operation any watery or for-
eign substance that may occupy its or their pores are pressed out it or they
are then drawn over the edge of the platform without lifting out of the liquid
which must be avoided as much as possible (if pressed under ooze) and suspen-
ded in the vat where they are suffered to expand which they do in 6 or 8 hours
and by the act of expansion or swelling the pores and ducts &c are charged with
the tanning lixivium which having deposited its tannin the succeeding pres-
sure of the rollers expels the exhausted or watery parts that now only remain and
prepare them to receive a fresh charge, and so with every compression and
expansion until the process of tanning is completed or so much of it as
that liquor is deemed capable of performing. after which it or they are taken
to a stronger. where they are treated in like manner. and thence again to a
stronger until the operation is finished which for heavy leather takes
place in 6 or 8 weeks and for light skins from 6 to 12 days. For the pur
pose of economising time and labour we place a series of platforms & vats
in their continuation so as to enable the workmen to commence the ope-
ration at the first or weakest, which should mark from 1 to 2 degrees
on the hydrometer, and bring the hides out perfectly tanned at the last or
strongest marking from 6 to 8 degrees. However a little experience and obser
vation will point out the best practical course, better than any written direc
tions on the subject. it is necessary to remark that the weight used for
compression must be [illegible] according to the thickness of the hides and be light-
end 1650 8329X 381 and as the tanning progresses. this also must be committed to the judgment of the oper-
ator — Now What We claim as new and our invention is. First. the mix-
ture or compound of the ingredients as herein described for softening the hides and
neutralizing the grease — Second. the mixture or compound of the ingredients
as herein described for expanding or swelling the hides preparatory to receiving
the tanning lixivium — Third. the procuring the pure tanning lixivi
um by filtering the ooze as herein described — Fourth — the compressing
the hides separately or collectively by mechanical means under the ooze or out
of the ooze and suffering them to expand alternately so as to cause the
tanning lixivium to enter and to expell it when exhausted and also the
apparatus or machine herein described to be used for that purpose.
In testimony that the foregoing is a true description of our said inven
tion or improvement We have hereunto subscribed our names this 22nd
day of July 1834.

Witnesses
S. B. Eaty
Nath^l Gougin

Drawing

Edward S. Bell
Daniel V. Bell

Exd.
W.H.

1846 [illegible] (Patented July 28. 1834